United States Patent [19]
Thomae

[11] Patent Number: 5,899,397
[45] Date of Patent: * May 4, 1999

[54] GUIDE FOR RECIPROCATING SHAFT ON A FISHING REEL

[75] Inventor: Brent Wayne Thomae, Broken Arrow, Okla.

[73] Assignee: Zebco Division of Brunswick Corporation, Tulsa, Okla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,416

[22] Filed: Dec. 4, 1996

[51] Int. Cl.$^6$ .................................................. A01K 89/027
[52] U.S. Cl. .......................... 242/245; 242/321; 242/241; 384/49; 464/167
[58] Field of Search ...................... 242/245, 241, 242/242, 321; 384/49; 464/167

[56] References Cited

U.S. PATENT DOCUMENTS

| | | | |
|---|---|---|---|
| 2,952,145 | 9/1960 | Thompson | 464/167 |
| 3,112,625 | 12/1963 | Leto | 464/167 |
| 4,075,872 | 2/1978 | Geisthoff | 464/167 |
| 4,203,565 | 5/1980 | Puryear . | |
| 4,391,419 | 7/1983 | Iwama et al. | 242/245 |
| 4,402,469 | 9/1983 | Stiner . | |
| 4,426,045 | 1/1984 | Gifford . | |
| 4,466,580 | 8/1984 | Toda | 242/245 |
| 4,488,689 | 12/1984 | Councilman . | |
| 4,509,705 | 4/1985 | Councilman et al. . | |
| 4,676,450 | 6/1987 | Carpenter et al. . | |
| 4,705,491 | 11/1987 | Anderson | 464/167 |
| 4,725,012 | 2/1988 | Councilman . | |
| 4,792,106 | 12/1988 | Hlava . | |
| 4,796,828 | 1/1989 | Councilman . | |
| 5,040,743 | 8/1991 | Zurcher et al. . | |
| 5,143,318 | 9/1992 | Tipton et al. . | |

FOREIGN PATENT DOCUMENTS

| | | | |
|---|---|---|---|
| 558 483 | 1/1975 | Switzerland | 464/167 |

*Primary Examiner*—Katherine Matecki
*Attorney, Agent, or Firm*—Wood, Phillips, VanSanten, Clark & Mortimer

[57] ABSTRACT

A fishing reel having a frame, a line carrying spool, and first structure for mounting the line carrying spool to the frame for reciprocating movement in a first predetermined path. The first structure includes a shaft that moves reciprocatively in a second predetermined path as an incident of which the line carrying spool moves in the first predetermined path. Second suture is provided on the frame for directing line onto the line carrying spool, with there being third structure cooperating between the first and second structures for causing reciprocating movement of the shaft in the second predetermined path as an incident of the second structure being operated. The first structure includes a rolling element cooperating between the shaft and the frame for guiding movement of the shaft in the second predetermined path.

16 Claims, 2 Drawing Sheets

GUIDE FOR RECIPROCATING SHAFT ON A FISHING REEL

BACKGROUND OF THE INVENTION

1. Field of the Invention

This invention relates to fishing reels having an operating mechanism including a shaft that both rotates about, and translates relative to, an axis and, more particularly, to a bearing structure for supporting a part of the shaft.

2. Background Art

In a spinning fishing reel construction, a line carrying spool is mounted to the front of a frame. A rotor, with a bail assembly thereon, rotates to wrap line around the line carrying spool. An externally situated crank handle drives an operating mechanism which rotates the rotor and at the same time effects oscillation of the spool about a fore and aft axis. This oscillation accounts for an even distribution of line along the axial extent of the spool. In a typical construction, the spool is mounted upon a shaft which extends to the rear of the reel. The operating mechanism acts upon the rearwardly extending shaft to effect reciprocating movement thereof.

With the bail assembly in a retrieve position, the line can be drawn from the spool only by either reversely rotating the rotor or effecting rotation of the spool about its axis. To prevent unimpeded rotation of the spool, a drag mechanism is incorporated into the reel. In a typical, rear mounted drag system, a drag force is applied to the rear free end of the spool shaft.

In one known form, one or more drag washers are keyed to the rear end of the shaft to rotate therewith. These drag washers are sandwiched between another series of drag washers which are rotatable relative to the shaft. Through a threaded actuator, the stack of drag washers can be compressed against the reel frame, thereby developing a variable frictional force between the washers and the frame. An exemplary drag system of this type is shown in U.S. Pat. No. 4,402,469, to Stiner.

In the Stiner structure, the shaft is required to slide lengthwise relative to the drag washers to which it is keyed. With no torque exerted on the spool, this does not create a problem. However, with the spool and associated shaft torqued, as when reeling in a fish, the shaft tends to skew. As a result, frictional forces between the shaft and the drag washers to which it is keyed increases. This offers resistance to the reciprocating movement of the shaft. Since the oscillating mechanism is driven through the line retrieve mechanism, the line retrieve mechanism similarly encounters resistance. Smooth operation of the reel is thus impeded.

In another prior art system, a die-cast metal housing is provided with an opening to key the spool shaft end against rotation while allowing relative translatory movement between the shaft and housing. While the problem of detrimental friction between the shaft and housing is present, it is not as pronounced as with the shaft keyed to the drag washers having a higher coefficient of friction. Nonetheless, there may be significant resistance to line retrieval.

SUMMARY OF THE INVENTION

In one form of the invention, a fishing reel is provided having a frame, a line carrying spool, and first structure for mounting the line carrying spool to the frame for reciprocating movement in a first predetermined path. The first structure includes a shaft that moves reciprocatively in a second predetermined path as an incident of which the line carrying spool moves in the first predetermined path. Second structure is provided on the frame for directing line onto the line carrying spool, with there being third structure cooperating between the first and second structures for causing reciprocating movement of the shaft in the second predetermined path as an incident of the second structure being operated. The first structure includes a rolling element cooperating between the shaft and the frame for guiding movement of the shaft in the second predetermined path.

In one form, the shaft translates in a substantially straight line in the second predetermined path.

The shaft has a lengthwise axis. In one form, the first structure includes a housing, fourth structure cooperating between the shaft and housing for limiting relative rotation between the shaft and housing around the shaft axis, and fifth structure cooperating between the housing and frame for maintaining the housing in an operative position on the frame. The rolling element acts between the shaft and housing to guide movement of the shaft relative to the housing lengthwise of the shaft axis.

The fourth structure may include the rolling element.

In one form, the rolling element is a ball and the housing includes a pocket for the ball defined by a curved surface. A flat is provided on the shaft, with the ball residing between the curved housing surface defining the pocket and the flat on the shaft.

The fourth structure may include a plurality of rolling elements spaced around the shaft and acting between the shaft and housing.

In one form, drag structure is provided cooperating between the housing and frame for selecting a variable torque that must be applied to the shaft to cause the shaft to rotate about its axis.

The fifth structure may maintain the housing in the operative position in such a manner that the housing is rotatable with the shaft around the shaft axis. In one form, the drag structure includes at least one drag washer that is keyed to the housing to follow rotation thereof and a friction surface on at least one of the frame and a second drag washer against, and relative to which, the drag washer rotates.

The drag structure may produce a variable force between the drag washer and the friction surface on the frame.

In one form, the housing is at the shaft free end.

In one form, the frame has a wall through which the spool shaft extends, with the housing being situated against the frame wall so that the free end of the shaft projects into the housing.

In another form, a fishing reel is provided having a frame, a line carrying spool, and first structure for mounting the line carrying spool to the frame for reciprocating movement in a first predetermined path. The first structure includes a shaft that moves reciprocatively in a second predetermined path as an incident of which the line carrying spool moves in the first predetermined path. A rotor is provided, with there being second structure for mounting the rotor to the frame for rotation relative thereto. Third structure is provided on the rotor for wrapping line around the line carrying spool as an incident of the rotor being operated. Fourth structure operates the rotor and causes the line carrying spool to move reciprocatively in the first predetermined path. The first structure includes a rolling element cooperating between the shaft and the frame for guiding movement of the shaft in the second predetermined path.

The first structure may include a plurality of rolling elements that are balls, with the shaft having an axis and outer surface with a plurality of circumferentially spaced flats thereon. The balls roll guidingly over the flats as the shaft moves in the second predetermined path.

The first structure may include a housing that surrounds the shaft so that the balls are captured between the housing and the shaft.

The third structure may be a movable bail assembly.

DETAILED DESCRIPTION OF THE DRAWINGS

Figure 1:
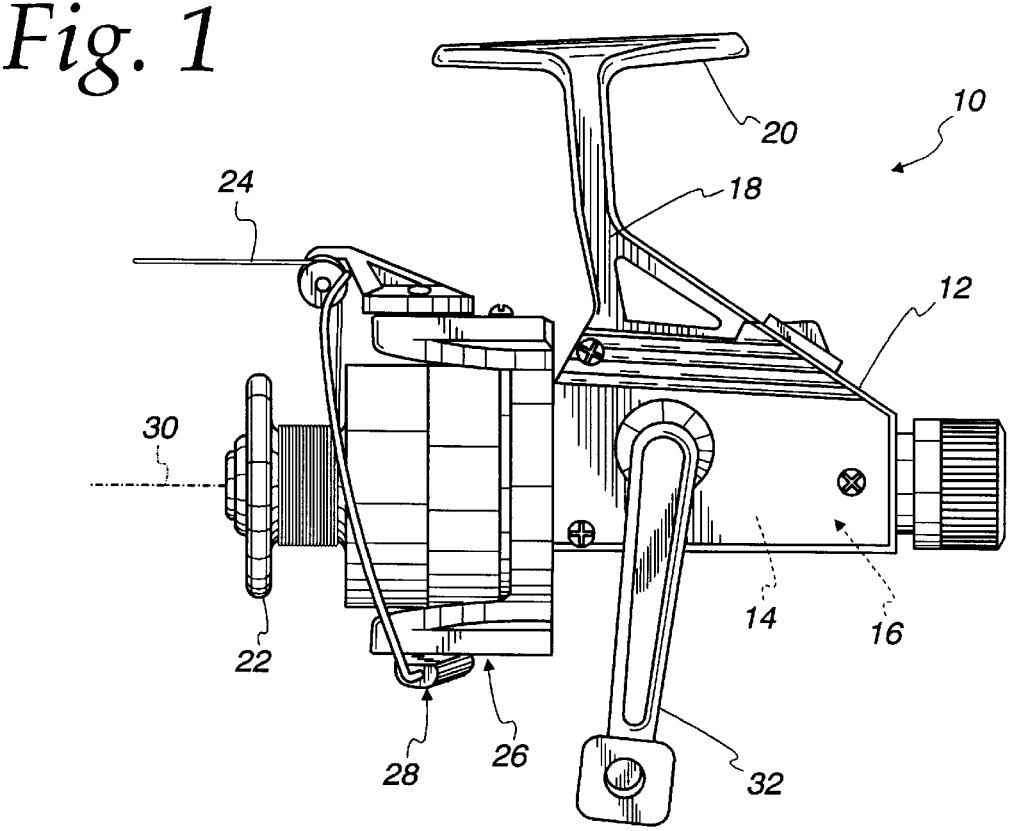
FIG. 1 is a side elevation view of a fishing reel incorporating a guide for a reciprocating/oscillating spool shaft, according to the present invention.
Figure 2:
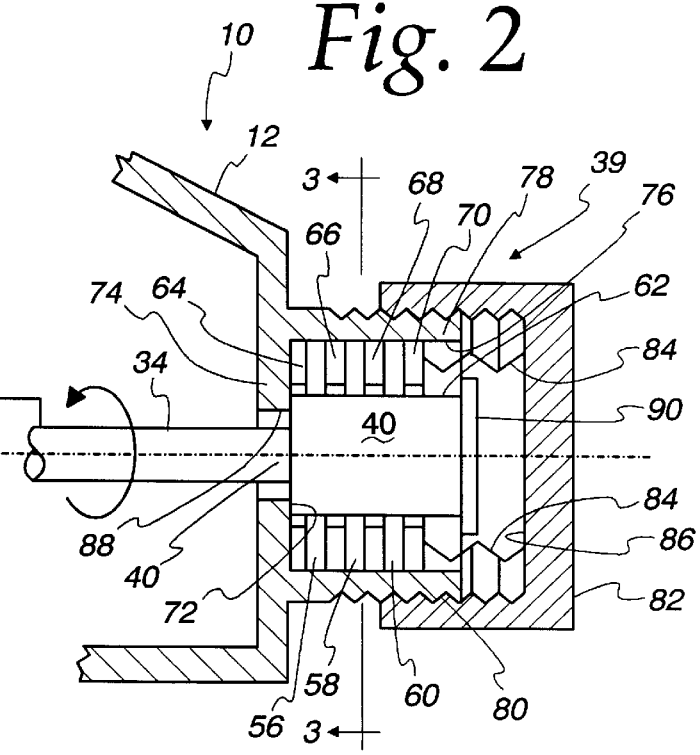
FIG. 2 is an enlarged, fragmentary, cross-sectional view of the rear of the reel in FIG. 1 and showing the inventive shaft guide.

In FIGS. 1–4, a spinning-type fishing reel is shown at 10. The entire mechanism for a similar fishing reel is shown in U.S. Pat. No. 4,824,040, to Carpenter et al, incorporated herein by reference. It is not necessary, for an understanding of the present invention, to describe herein the details of operation of the reel 10.

Briefly, the fishing reel 10 has a frame 12 defining an internal compartment 14 for part of an operating mechanism 16. The frame 12 blends into a mounting stem 18, which terminates at a mounting foot 20 which can be attached in conventional fashion to a fishing rod (not shown).

At the forward end of the frame 12, a spool 22, for a supply of fishing tine 24, is mounted. The line 24 is retrieved onto the spool 22 through a rotor assembly 26. A bail assembly 28 is carried by the rotor assembly 26 and wraps line around the spool 22 as the rotor assembly 26 is driven around a fore and aft axis 30.

The operating mechanism 16 is driven by an external crank handle 32 and causes rotation of the rotor assembly 26 around the axis 30 and simultaneously causes the shaft 34 mounted to the spool 22 to move reciprocatively in a linear, fore and aft path, through an oscillating mechanism 36 adjacent to the rear free end 38 of the shaft 34. Accordingly, as the crank handle 32 is operated to rotate the rotor assembly 26, the shaft 34 and spool 22 thereon move back and forth so that the line 24 is directed evenly along the axial extent of the spool 22.

While the spool 22 is normally in a stationary position, when a force is exerted on the line 24, with the reel in the retrieve mode of FIG. 1, a torque is produced on the spool 22. At a predetermined torque, the spool 22 will slip and allow the line 24 to pay off of the spool 22. To allow selection of the torque at which the spool 22 will slip, a variable drag applying structure is provided at 39.

According to the invention, a housing 40 is provided at the rear free end 38 of the shaft 34 to support the shaft end 38 on the frame 12. The housing 40 has a cylindrical wall 42 defining an internal receptacle 46 for the shaft end 38.

Figure 3:
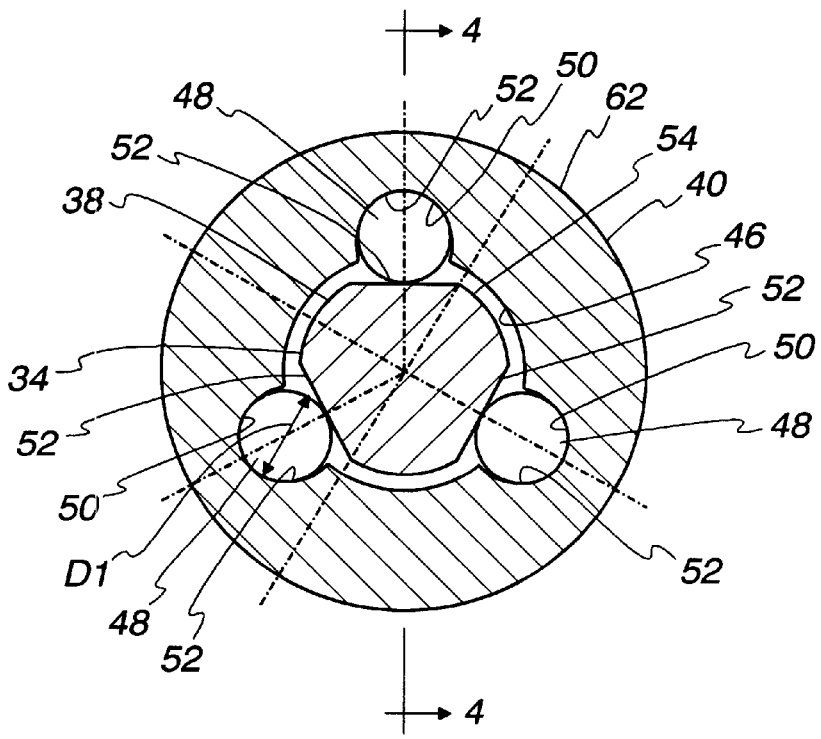
FIG. 3 is a cross-sectional view of the shaft and inventive shaft guide ten along line 3—3 of FIG. 2.
Figure 4:
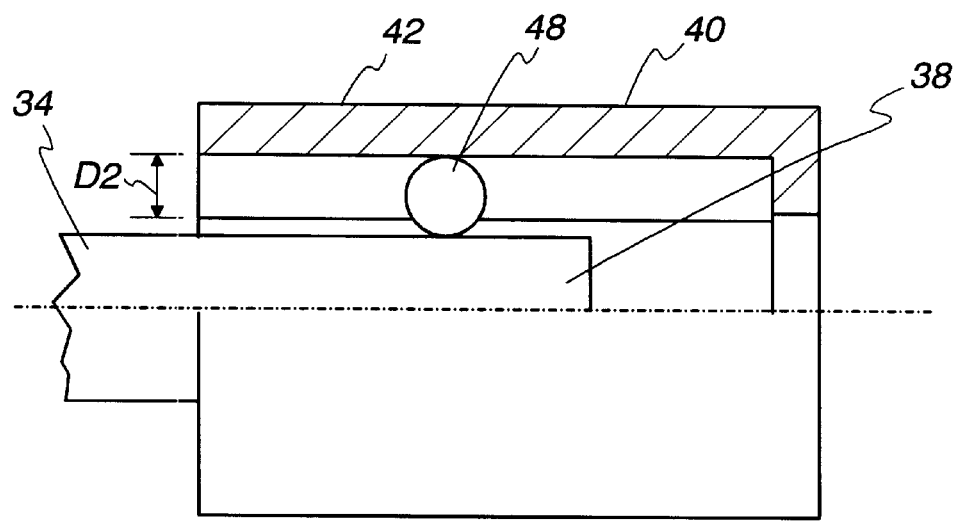
FIG. 4 is a fragmentary, cross-sectional view of the shaft and inventive shaft guide taken along line 4—4 of FIG. 3.

A plurality of rolling elements 48, in this case balls, are captive between the housing 40 and the shaft 34. More particularly, the housing 40 defines a plurality of pockets 50, each bounded by a curved, elongate surface 52, which guides the balls 48 in a fore and aft direction relative to the housing 40. As shown in FIGS. 3 and 4, each of the rolling elements 48 have a diameter D1 and each of the pockets 50 has a depth D2 this is greater than one-half D1.

In the depicted embodiment, three balls 48 and pockets 50 are shown. However, the number of balls 48 and pockets 50 is a design consideration. Additionally, rolling cylinders, or the like, could be incorporated to accomplish this same end.

To key the housing 40 for rotation with the shaft 34, flats 53 are provided on the external surface 54 of the shaft 34 in circumferential alignment with the pockets 50. The flats 53 facilitate rolling of the balls 48 in a fore and aft direction and at the same time limit relative rotation between the housing 40 and shaft 34. Rotation of the shaft 34 in either direction causes each flat 53 to bear upon a ball 48 which is blocked in the adjacent pocket 50.

With the above arrangement, the housing 40 will follow rotation of the shaft 34 about the axis 30. At the same time, the cooperative arrangement between the balls 48, shaft 34, and housing 40 smoothly guides translatory movement of the shaft end 38 in a line parallel to the axis 30 as the shaft 34 reciprocates/oscillates in use.

The housing 40 is incorporated into the drag mechanism 39 so that the variable force resisting rotation of the shaft 34 is applied through the housing 40. In this particular embodiment, the drag mechanism 39 includes drag washers 56, 58, 60 that are attached to the outer surface 62 of the housing 40 as through a conventional keyed connection, to rotate therewith. Another group of washers 64, 66, 68, 70 surrounds the housing 40, with each washer 64, 66, 68, 70 being rotatable relative to the housing 40. The washers 56, 58, 60 alternate axially of the housing with the washers 64, 66, 68 and 70. The forwardmost washer 64 in the stack abuts to a rearwardly facing surface 72 on the rear wall 74 of the frame 12.

By urging the stack of drag washers 56, 58, 60, 64, 66, 68, 70 towards the frame wall 74, a variable frictional force is developed between a) the frame 12 and the washer 64 and b) the washers 56, 58, 60, 64, 66, 68, 70 that controllably resists rotation of the housing 40. By increasing the axial force on the stack towards the frame wall 74, this drag force is increased.

The housing 40, together with the drag washers 56, 58, 60, 64, 66, 68, 70 operatively arranged thereon, is received within a rearwardly opening, cup-shaped receptacle 76 defined by an integrally formed, annular extension 78 from the rear frame wall 74. The extension 78 has an external thread 80 to which an end cap/actuator 82 is threadably engaged. A spring element 84 is positioned between a forwardly facing surface 86 on the actuator 82 and the rearwardmost washer 70 in the stack. Turning of the actuator 82 so as to move the surface 86 forwardly compresses the spring element 84 and thereby increases the compressive force upon the stack of drag washers 56, 58, 60, 64, 66, 68, 70, bearing the same against the rear frame wall 74 to increase drag.

The shaft 34 extends through a bore 88 in the rear frame wall 74 that has a diameter less than that of the housing 40. Accordingly, with the shaft 34 extending through the rear wall 74 and into the housing 40, and the actuator 82 in place, the housing 40 is captively maintained captive between the rearwardly facing surface 72 on the rear wall 74 and the forwardly facing surface 86 on the actuator 82. The housing 40 has a retainer 90 at its rear end.

The foregoing disclosure of specific embodiments is intended to be illustrative of the broad concepts comprehended by the invention.

I claim:

1. A fishing reel comprising:

a frame;

a shaft that is reciprocatively movable relative to the frame in a first translational path said shaft defining a lengthwise axis;

a line carrying spool driven by the shaft in a second translational path as the shaft is moved reciprocatively in the first translational path; and a rolling element acting between the shaft and the frame a housing mounted between the shaft and the frame, the rolling element acting between the housing and the shaft to guide movement of the shaft along the first translational path, the housing having a pocket extending parallel to the lengthwise axis and receiving the rolling element;

wherein the shaft, the line spool, and the housing are mounted for rotation about the axis relative to the frame with the shaft being driven about the axis by the line spool as the line spool is rotated about the axis; and the shaft includes a flat engaged with the rolling element to drive the housing about the axis with the shaft.

2. The fishing reel of claim 1 wherein the shaft defines a lengthwise axis and the first translational path is along the axis.

3. The fishing reel of claim 1 wherein the rolling element has an outer periphery with a diameter D1, and the pocket has a depth D2 into the housing that is greater than ½ D1.

4. The fishing reel of claim 1 further comprising a drag element mounted between the housing and the frame to apply a drag torque to the housing to resist rotation of the housing about the axis.

5. The fishing reel of claim 4 wherein the drag element is keyed to the frame to restrict rotation of the drag element relative to the frame.

6. The fishing reel of claim 4 wherein the drag element is keyed to the housing to follow rotation thereof.

7. The fishing reel of claim 4 further comprising an actuator mounted on the frame to apply a variable force to the drag element to vary the drag torque applied to the housing.

8. The fishing reel of claim 1 wherein the shaft has a free end and the housing surrounds the free end of the shaft.

9. The fishing reel of claim 1 wherein the rolling element comprises a ball.

10. A fishing reel comprising:

a frame;

a plurality of rolling elements;

a shaft mounted to the frame for rotation about an axis relative to the frame and reciprocative translation along the axis relative to the frame, the shaft including a plurality of flats engaged with the rolling elements;

a line carrying spool mounted to the frame for rotation about the axis relative to the frame and driven by the shaft along the axis as the shaft is moved reciprocatively along the axis, the line carrying spool driving the shaft about the axis as the line carrying spool is rotated about the axis;

a housing mounted to the frame for rotation about the axis, the housing surrounding the shaft and including a plurality of pockets extending parallel to the axis, the pockets receiving the rolling elements to guide movement of the shaft along the axis and to restrict relative rotation between the shaft and the housing; and a drag element mounted between the housing and the frame to apply a drag torque to the housing to resist rotation of the housing about the axis.

11. The fishing reel of claim 10 wherein the rolling element has an outer periphery with a diameter D1, and the pocket has a depth D2 into the housing that is greater than ½ D1.

12. The fishing reel of claim 10 wherein the drag element is keyed to the frame to restrict rotation of the drag element relative to the frame.

13. The fishing reel of claim 10 wherein the drag element is keyed to the housing to follow rotation thereof.

14. The fishing reel of claim 10 further comprising an actuator mounted on the frame to apply a variable force to the drag element to vary the drag torque applied to the housing.

15. The fishing reel of claim 10 wherein the shaft has a free end and the housing surrounds the free end of the shaft.

16. The fishing reel of claim 15 wherein the rolling element comprises a ball.

* * * * *